(12) United States Patent
Ortman et al.

(10) Patent No.: US 11,797,029 B2
(45) Date of Patent: Oct. 24, 2023

(54) SYSTEMS AND METHODS FOR OPERATING DRONES IN PROXIMITY TO OBJECTS

(71) Applicant: Ford Global Technologies, LLC, Dearborn, MI (US)

(72) Inventors: Richard Ortman, Saline, MI (US); Krishna Bandi, Farmington Hills, MI (US); Syed Amaar Ahmad, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 17/379,731

(22) Filed: Jul. 19, 2021

(65) Prior Publication Data
US 2023/0013444 A1 Jan. 19, 2023

(51) Int. Cl.
 *G05D 1/10* (2006.01)
 *G05D 1/00* (2006.01)
 *G05D 1/06* (2006.01)

(52) U.S. Cl.
 CPC .......... *G05D 1/106* (2019.05); *G05D 1/0055* (2013.01); *G05D 1/0676* (2013.01); *G05D 1/105* (2013.01)

(58) Field of Classification Search
 CPC .... G05D 1/106; G05D 1/0055; G05D 1/0676; G05D 1/105
 See application file for complete search history.

(56) References Cited

U.S. PATENT DOCUMENTS

| | | | |
|---|---|---|---|
| 10,049,589 B1 * | 8/2018 | Boyd | B64D 47/08 |
| 10,152,059 B2 | 12/2018 | Banerjee et al. | |
| 10,163,177 B2 | 12/2018 | Farris et al. | |
| 10,395,544 B1 * | 8/2019 | Harris | B64F 1/007 |
| 2015/0339928 A1 * | 11/2015 | Ramanujam | G08G 1/202 701/23 |
| 2017/0036777 A1 * | 2/2017 | Martin | B64U 10/13 |
| 2017/0197710 A1 | 7/2017 | Ma | |

(Continued)

FOREIGN PATENT DOCUMENTS

| | | | | |
|---|---|---|---|---|
| CN | 111367309 A | * | 7/2020 | |
| CN | 111967313 B | * | 4/2022 | G06K 9/0063 |

(Continued)

OTHER PUBLICATIONS

Ford Media Center, "Ford Targets Drone-To-Vehicle Technology To Improve Emergency Services, Commercial Business Efficiency", Ford Media Center, Jan. 5, 2016, 5 pages.

(Continued)

*Primary Examiner* — Shelley Chen
(74) *Attorney, Agent, or Firm* — Brandon Hicks; Eversheds Sutherland (US) LLP

(57) ABSTRACT

Systems and methods for operating drones in proximity to objects are disclosed herein. An example method includes determining a change in drone, flight status that involves a rotor of the drone being active, determining presence of a mobile device within a designated clearance area established around the drone, preventing the drone from landing, providing a warning message to a user of the mobile device to clear away from the designated clearance area, detecting that the mobile device and the user are not within the designated clearance area, and causing the drone to land.

18 Claims, 4 Drawing Sheets

(56) References Cited

U.S. PATENT DOCUMENTS

| | | | | |
|---|---|---|---|---|
| 2017/0275025 | A1* | 9/2017 | Johnson | B60L 53/16 |
| 2018/0237137 | A1* | 8/2018 | Tovey | B64D 47/08 |
| 2018/0286239 | A1* | 10/2018 | Kaloyeros | G08G 1/065 |
| 2019/0217968 | A1* | 7/2019 | Schmidt | B64C 39/024 |
| 2019/0250640 | A1* | 8/2019 | O'Flaherty | G06N 3/0454 |
| 2020/0062388 | A1 | 2/2020 | Bolanos et al. | |
| 2020/0186689 | A1* | 6/2020 | Outwater | H04N 5/2258 |
| 2020/0294164 | A1* | 9/2020 | Redmon | B64C 39/024 |
| 2021/0209954 | A1* | 7/2021 | Tazume | B64C 39/024 |
| 2022/0225107 | A1* | 7/2022 | Kimberly | H04W 12/66 |

FOREIGN PATENT DOCUMENTS

| | | | | |
|---|---|---|---|---|
| CN | 112558637 | B * | 11/2022 | G05D 1/104 |
| KR | 102217918 | B1 * | 2/2021 | |

OTHER PUBLICATIONS

Tyler Duvall et al, "Air-Mobility Solutions: What They'll Need To Take Off", McKinsey & Company, Travel, Logistics & Infrastructure, Feb. 19, 2019, 22 pages.

* cited by examiner

SYSTEMS AND METHODS FOR OPERATING DRONES IN PROXIMITY TO OBJECTS

BACKGROUND

As drones become more ubiquitous in society and prevalent in business models, interaction between drones and bystanders is a potential concern. For example, some drone operations may bring humans into proximity to the drone. Drone propellers, rotating at high speeds, are a potential hazard.

A drone may be operating in an autonomous mode or may be under the control of a dispatcher. In either case, a drone that is currently "off" (e.g., rotors/propellers) could be started (caused to rotate) when a human is in proximity to the drone, which is not ideal.

BRIEF DESCRIPTION OF THE DRAWINGS

A detailed description is set forth, regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for operating a drone near humans, vehicles, or other objects. A drone can be configured to operate autonomously and/or in a semi-autonomous manner (being directed by a remote operator or service provider). Regardless of the mode of operation, the drone can utilize various modes of communication and/or various sensors to detect the presence of an object and/or a distance between the drone and the object. The drone can be configured, either autonomously or by way of command, to (1) ensure that no objects are within a designated clearance area and/or (2) prevent activation of the drone rotors until the designated clearance area is determined to be unoccupied.

In some instances, the rotors of the drone can be disabled while objects are located in the designated clearance area. For example, when a user is picking up a package being delivered by the drone and the user is in the designated clearance area, the drone rotor(s) can be disabled.

In other examples, a mobile device of the user can act as a kill switch. The presence of the mobile device inside the designated clearance area may disable the rotors of the drone. In some instances, the size of the designated clearance area can be dictated by a range of the communications method being employed between the drone and the mobile device.

A determination as to whether the designated clearance area is occupied/unoccupied may be performed by a dispatcher based on video obtained by the drone prior to events such as takeoff, warmup, landing, and the like. In an autonomous mode, a drone can confirm that the user and the mobile device are collocated by requiring the user to depress a button or contact a touchscreen of the mobile device.

The drone can also be configured to communicate with a connected vehicle. For example, the drone can receive signals from the connected vehicle that confirm that the user is present in the vehicle and at a safe distance from the drone.

Illustrative Embodiments

Figure 1:
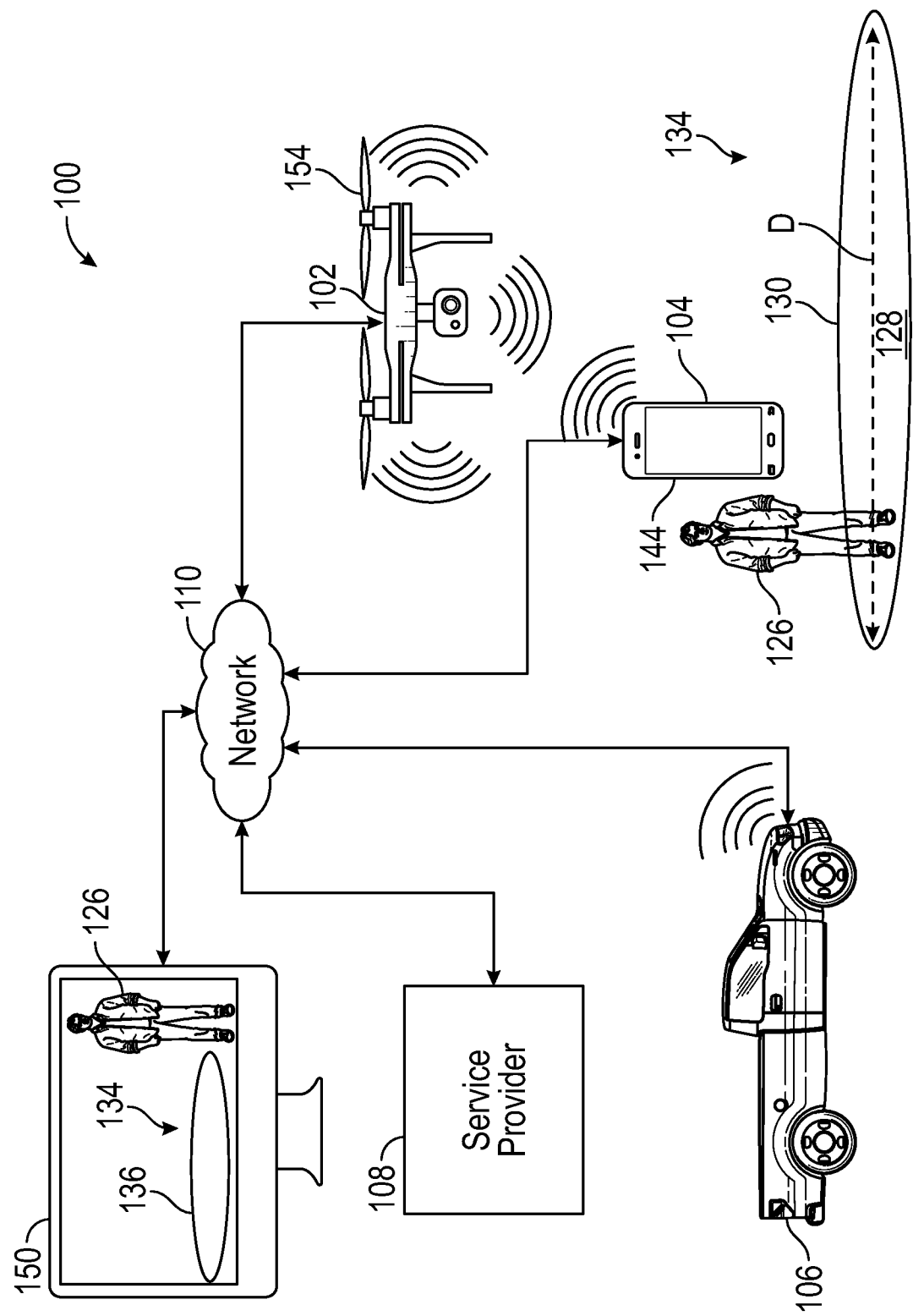
FIG. 1 illustrates an example architecture where the systems and method of the present disclosure may be practiced.

Turning now to the drawings, FIG. 1 depicts an illustrative architecture 100 in which techniques and structures of the present disclosure may be implemented. The architecture 100 includes a drone 102, a mobile device 104, a connected vehicle 106, a service provider 108, and a network 110.

In some instances, some or all of these components in the architecture 100 can communicate directly with one another via various wireless protocols. In other instances, some or all of these components in the architecture 100 can communicate with one another using the network 110 and/or directly with one another. The network 110 can include combinations of networks that enable the components in the architecture 100 to communicate with one another. The network 110 may include any one or a combination of multiple different types of networks, such as cellular, cable, the Internet, wireless networks, and other private and/or public networks. In some instances, the network 110 may include Wi-Fi or Wi-Fi direct. The network 110 can include short-range or, radiofrequency links such as BLUETOOTH or ultra-wideband (UWB).

Figure 2:
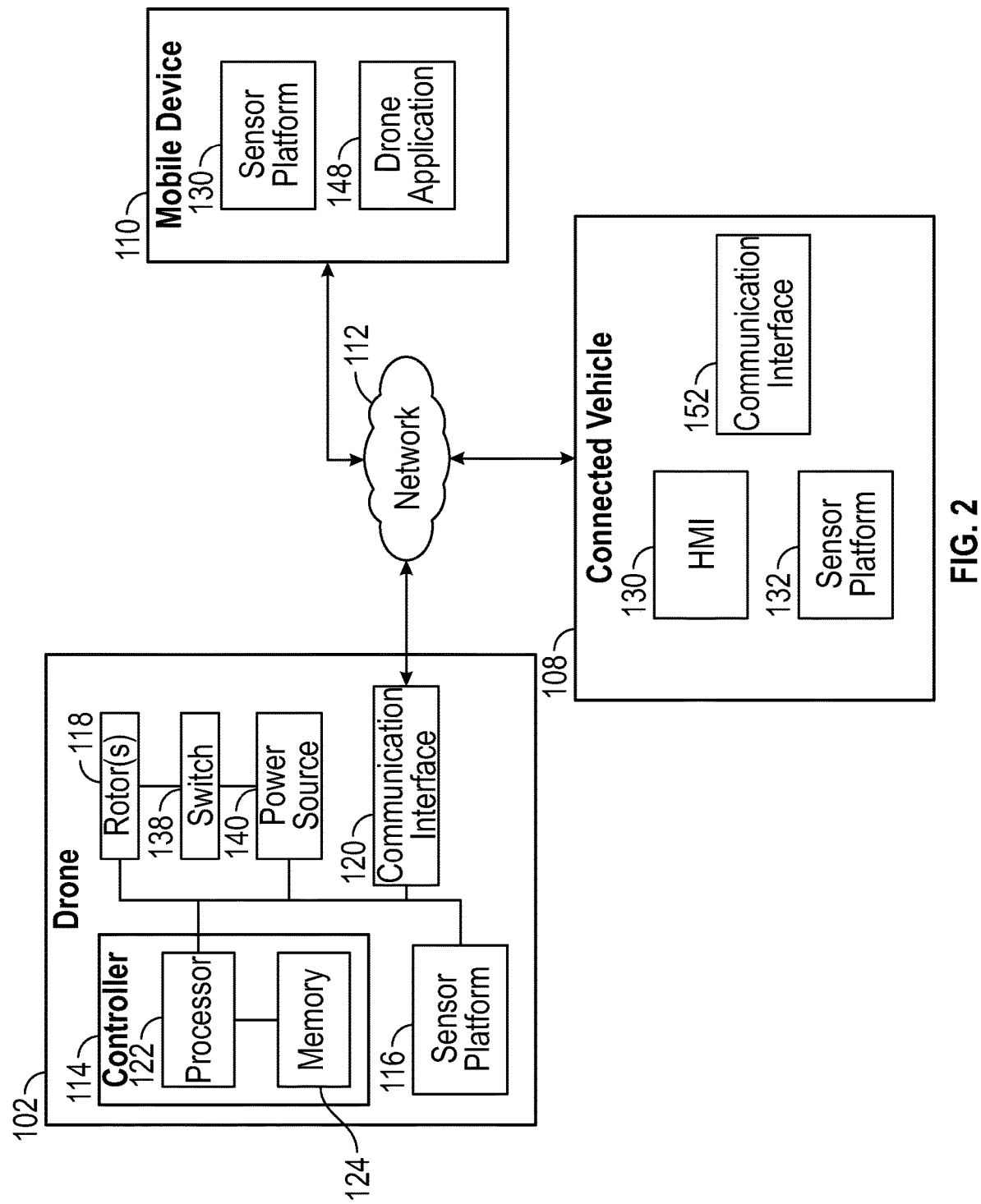
FIG. 2 is a schematic diagram of components of the architecture of FIG. 1.

Referring now to FIGS. 1 and 2 collectively, the drone 102 may comprise a controller 114, a sensor platform 116, a rotor 118 (can include more than one rotor), and a communications interface 120. The controller 114 may comprise a processor 122 and memory 124 for storing instructions. The processor 122 executes instructions stored in memory 124 to perform any of the methods disclosed herein. When referring to actions performed by the controller 114 or drone 102, this implicitly involves the execution of instructions by the processor 122. In one example, memory 124 can store and execute flight control logic, sensor analysis logic, and/or image processing logic.

The sensor platform 116 can comprise any one or more of an ultrasonic transducer, a microphone, a speaker, a motion sensor, a thermal scanner, an infrared camera, LIDAR (light detection and ranging), and radar—just to name a few. Each of these sensors can be used to detect the presence of objects such as humans, animals, vehicles, and the like. Various use cases with some of these sensors will be disclosed in greater detail infra.

The communications interface 120 may allow the controller 114 to access the network 110 using any suitable long-range wireless communication protocol. The communications interface 120 may allow the controller 114 to communicate with the mobile device 104 and/or the connected vehicle 106 over a short-range wireless communication protocol. Short-range wireless communications may allow for localizing technologies to be enabled, such as BLUETOOTH 5.1 and/or UWB.

For context, the rotor 118 can be coupled with a blade or propeller 154 that is used to provide lift for the drone 102. The rotor 118 can be operated by signals received from the controller 114. That is, the controller 114 can activate and/or deactivate the rotor 118 to cause the blade or propeller to rotate or cease rotation.

The controller 114 can be configured to determine the presence of an object, such as a human 126 within a designated clearance area 128. The designated clearance area 128 can be defined by a perimeter 130 extending around the drone 102 at a distance D. The diameter D is illustrated as a reference line in FIG. 1. The size and/or shape of the designated clearance area 128 may vary according to operating parameters; as well as drone configuration. For example, the designated clearance area 128 may have a size that is a predetermined multiple of the overall size of the drone 102. If the drone 102 has a footprint that is approximately five feet in diameter, the designated clearance area 128 may have a size that is three times the diameter of the drone 102, resulting in a designated clearance area 128 with a diameter of fifteen feet around the drone 102. It will be understood that the size of the designated clearance area 128 can be arbitrarily chosen, or calculated using any factor or parameter(s) of safety that are desired by operators. The purpose of the designated clearance area 128 is to reduce or eliminate the likelihood that the drone 102 will encounter a user or vehicle at any point in time in which the rotor 118 is turning.

In one example, the detection of objects in the designated clearance area 128 by the controller can occur when a change in flight state for the drone 102 is occurring or is about to occur. For example, the controller 114 may utilize the output of the sensor platform 116 to search for the presence of an object within the designated clearance area 128 when the drone 102 is about to land in the designated clearance area 128.

In another example, the controller 114 may utilize the output of the sensor platform 116 to search for the presence of an object within the designated clearance area 128 when the drone 102 is about to activate the rotor 118 in anticipation of takeoff. In yet another example, the controller 114 may utilize the output of the sensor platform 116 to search for the presence of an object within the designated clearance area 128 when the drone 102 is launching (e.g., transitioning from a landed position to flying).

Each of the mobile device 104 and the connected vehicle 106 may be configured with corresponding/complementary sensors in their respective sensor platforms. For example, the mobile device 104 may have a sensor platform 130 comprising any one or more of an ultrasonic transducer, a microphone, a speaker, a motion sensor, a thermal scanner, an infrared camera, LIDAR (light detection and ranging), and radar—just to name a few. The mobile device 104 may also comprise a drone application 148 that allows the user to interact with the drone 102. For example, the drone application 148 can be used to emit kill signals, as well as receive warning messages from the drone 102, as will be discussed in greater detail herein.

The connected vehicle 106 may also have a sensor platform 132 comprising any one or more of an ultrasonic transducer, a microphone, a speaker, a motion sensor, a thermal scanner, an infrared camera, LIDAR (light detection and ranging), and radar. In some instances, the sensors deployed on each of the drone 102, the mobile device 104, and/or connected vehicle 106 may be selected during manufacturing to ensure compatibility. For purposes of brevity and clarity, example use cases are provided herein. However, it will be understood that the drone 102, mobile device 104, and/or connected vehicle 106 each have complementary sensor(s) relative to one another. The connected vehicle 106 can also comprise a communications interface 152 that allows for short and/or long-range communication with the drone 102, the mobile device 104, and/or the service provider 108.

In one example, use case, the controller 114 of the drone 102 can determine its location from, for example, GPS signals of the communications module. As noted above, the controller 114 can incorporate localization technologies such as BLUETOOTH, UWB, Wi-Fi, and the like to obtain accurate location information. Once the location of the drone 102 is determined, the controller 114 can determine if a change in drone flight is occurring or will occur soon (this time frame can be tailored as needed). For example, the controller 114 of the drone 102 can determine that the drone 102 is about to land. In one example, the controller 114 of the drone 102 can determine that the drone 102 is about to land, based on an automated flight plan that the controller 114 is executing to autonomously fly the drone to a location. In another example, the controller 114 of the drone 102 can determine that the drone 102 is about to land, based on signals or commands received from the service provider 108. For example, the drone 102 can be controlled by a remote operator 146 who has initiated a process for drone, landing. The same process can occur for drone launch as well, with the drone being controlled by a remote operator 146.

In examples where a remote operator 146 is controlling the drone 102, the remote operator 146 can receive images from any one or more of the camera(s) included in the sensor platform 116 of the drone, or camera(s) associated with the sensor platforms of either or both of the mobile device 104 and the connected vehicle 106. Because each camera may obtain images from a unique perspective, the remote operator 146 can determine if objects are present in a landing area 134 where the drone may land. The remote operator 146 can also judge whether objects near the landing area 134 are set back at a safe distance. In this example, the landing area 134 corresponds, at least partially, in location to the designated clearance area 128 illustrated in FIG. 1.

In an autonomous mode of operation, the controller 114 of the drone 102 can execute image processing logic to utilize camera output from its won camera or that of other objects to assess when an individual may be inside the designated clearance area 128. For example, the controller 114 can identify a human, in the camera output. When a human is detected, the controller 114 can utilize distance or ranging sensors to determine a distance between the drone 102 and the detected human. For example, the controller 114 may execute a LIDAR, radar, or ultrasonic sensor to obtain distance measurements.

In other use cases, the remote operator can utilize output from the sensor platform 116 such as heat signatures, ultrasonic feedback, audio feedback, laser signals, and/or other similar sensor output that can be leveraged to determine a distance between the drone 102 and objects near the landing area 134.

In some instances, to assist the remote operator in assessing distance, a graphical user interface 150 can be presented that superimposes a virtual boundary 136 around the landing area 134. The virtual boundary 136 corresponds to the designated clearance area 128 disclosed above. The virtual boundary 136 is illustrated graphically in FIG. 1, however images/video obtained from the drone, mobile device, and/or connected vehicle can be augmented with the virtual boundary 136, creating an augmented reality experience for the remote operator. For example the user 126 may appear in the interface 150 when captured in the camera output.

The controller 114 can utilize localization information obtained from either or both of the mobile device 104 and the connected vehicle 106 to determine if the mobile device 104 and the connected vehicle 106 are within the designated clearance area 128. For example, the controller 114 can utilize specific location information obtained from the mobile device 104 and compare that location information to the known location of the drone 102 to determine if the mobile device 104 is within the designated clearance area 128. A similar process can be used to determine when the connected vehicle 106 is within the designated clearance area 128. As noted above, this can include exchanging information over long-range or short-range wireless communication links. The location information can be general location information that can be obtained from cellular network interactions or more specific localization technologies that may leverage radio-frequency (RF) communications.

When an object such as a human is detected inside the designated clearance area 128, the controller 114 can cause the drone 102 to hover rather than land. The controller 114 can emit an audible command from a speaker of the sensor platform 116 to warn the individual to clear the designated clearance area 128. In some instances, the controller 114 can transmit a warning message to the mobile device 104 and/or the connected vehicle 106 to warn the individual to clear away from the designated clearance area 128. For example, the mobile device 104 can display a message 144 that instructs the user that they are inside a designated clearance area and need to distance themselves. Other naming messages can be transmitted for display, such as a message that warns a user that the drone is about to activate its rotor(s) or take off. It is advantageous to raise user awareness when the drone is launching. For example, a sudden gust of wind may push the drone off course and bystanders may be endangered if they are located too closely to the drone.

If the person does not move, the controller 114 can locate a new landing area that allows the drone 102 to land at a suitable distance away from the individual or vehicle. The suitable distance can include any distance equal to or greater than that specified by the size of the designated clearance area 128.

In some instances, the controller 114 can utilize two or more sensor outputs to confirm the distance findings based on another sensor. For example, the controller 114 may determine that the mobile device 104 is outside the designated clearance area 128, and confirm that this fact is true using other sensor output, such as LIDAR measured distance or ultrasonic sensor output. Any sensor output used to determine or infer distance between the drone 102 and an object can be checked or verified using the output of a different type of sensor.

Additionally, while it may be inferred in some instances that the user of the mobile device 104 and the mobile device 104 are collocated, there may be instances where the user is separated from the mobile device 104. This may result in the mobile device 104 being located outside the designated clearance area 128, while the user is present in the designated clearance area 128. Thus, in some instances, the controller 114 may utilize the output of a sensor such as a thermal scanner to confirm that the user is not present in the designated clearance area 128, even when the mobile device 104 is not within the designated clearance area 128.

As a fail-safe operation, the controller 114 can receive a signal from the mobile device 104 that the user is collocated with the mobile device 104. For example, the user can be asked to depress a button on the mobile device 104 to confirm that they are present in the same location as the mobile device 104. In another example, the controller 114 can receive a signal from the mobile device 104 that the user has their finger or hand in contact with a touchscreen of the mobile device 104. Thus, the capacitive functionality of the mobile device screen can also be used to ensure the consumer is holding the mobile device and therefore is located where the mobile device GPS indicates that it is located. In sum, the controller 114 can determine that a user of a mobile device is collocated with the mobile device-based detection of a physical interaction between the user and the mobile device.

In situations where the user and their mobile device 104 are inside the designated clearance area 128, the mobile device 104 can be configured to emit audio, such as a sound pulse or ultrasonic signal to act as a signal to the controller 114 of the drone 102 to remain in a stopped state. In some instances, the mobile device 104 is triggered to emit this type of signal when the mobile device 104 enters the designated clearance area 128. Thus, the mobile device 104 can be programmed to sense the distance between itself and the drone 102 using any of the distance measurement methods disclosed herein. When the mobile device 104 determines that the distance between itself and the drone 102 is at or below the distance D specified for the designated clearance area 128, the mobile device 104 can automatically begin to emit the signals to disable the drone 102. Thus, even when the user forgets to activate the mobile device 104 for this type of interaction, the mobile device 104 is automatically triggered to output such signals.

Thus, the mobile device 104 can act as a kill switch that prevents the controller 114 from activating the rotor 108 when the mobile device 104 is near or inside the designated clearance area 128. For example, a user may wish to obtain a package from the drone 102 or maintain the drone 102. While the user is inside the designated clearance area 128, the mobile device 104 emits a signal that is received by a receiver of the sensor platform 116 of the drone 102. As long as the sensor is receiving the kill switch signal from the mobile device 104, the controller 114 can deactivate the rotor 118 to prevent unwanted or unintended activation of the propeller of the drone 102. In one example, the drone 102 can comprise a switch 138 that is positioned between the rotor 118 and a power source 140. The controller 114 can trip and open the switch 138 to prevent power from being delivered, from the power source 140 to the rotor 118.

While the embodiments above disclose interactions between the mobile device 104 and the drone 102, the connected vehicle 106 can also be configured to provide drone safety features as well. As noted above, the connected vehicle 106 can be configured to provide the controller 114 of the drone 102 and/or the service provider 108 with vehicle location information that can be used to determine a distance between the connected vehicle 106 and the drone 102. As with the mobile device 104, the connected vehicle 106 can also include localizing capabilities to more accurately identify a current location of the connected vehicle 106.

The connected vehicle 106 can comprise a human-machine interface (HMI 142) that may provide an interactive display that a user can utilize to receive information on drone operations, as well as provide input that can be used to improve user safety. For example, the sensor platform 132 of the connected vehicle 106 can monitor user presence within the cabin of the connected vehicle 106. In one example, the sensor platform 132 can include seatbelt sensors that detect when a seatbelt is being worn by a user. The sensor platform 132 can include a body eight sensor integrated into a seat of the connected vehicle 106. The sensor platform 132 can include capacitive elements integrated into a steering wheel, console, armrest, door panel, or other similar vehicle component. Each of these example sensors can be used to detect user presence inside the cabin of the connected vehicle 106. A signal indicating that the user is within the cabin of the connected vehicle 106 can be transmitted to the drone 10 and/or the service provider 108 using any of the communications methods disclosed herein. The vehicle can also serve as an alternative means for the user to communicate with the drone 102 and/or the service provider 108 in the event that the mobile device 104 is inoperative for any reason.

In some instances, multiple individuals may be present in the vehicle or around the designated clearance area 128. For example, in the case of a drone being dispatched to a vehicle for service, there may be multiple passengers in the vehicle. In such an event, the mobile devices of all the passengers may provide "proof-of-presence" for all passengers. Thus, rather than tracking and communicating only with a single mobile device, the drone 102 can be configured to determine the presence of multiple mobile devices and confirm that these multiple mobile devices are securely or safely within the cabin of the vehicle. By way of example, if multiple mobile deices are present and the sensor platform 132 of the vehicle indicates that multiple users are present in the vehicle, the drone can be informed that all individuals are safely within the vehicle. In one use case, the sensor platform 132 can determine that multiple seats are being occupied in the vehicle. Camera output could also be used to perform facial recognition to detect multiple users in the vehicle cabin.

Figure 3:
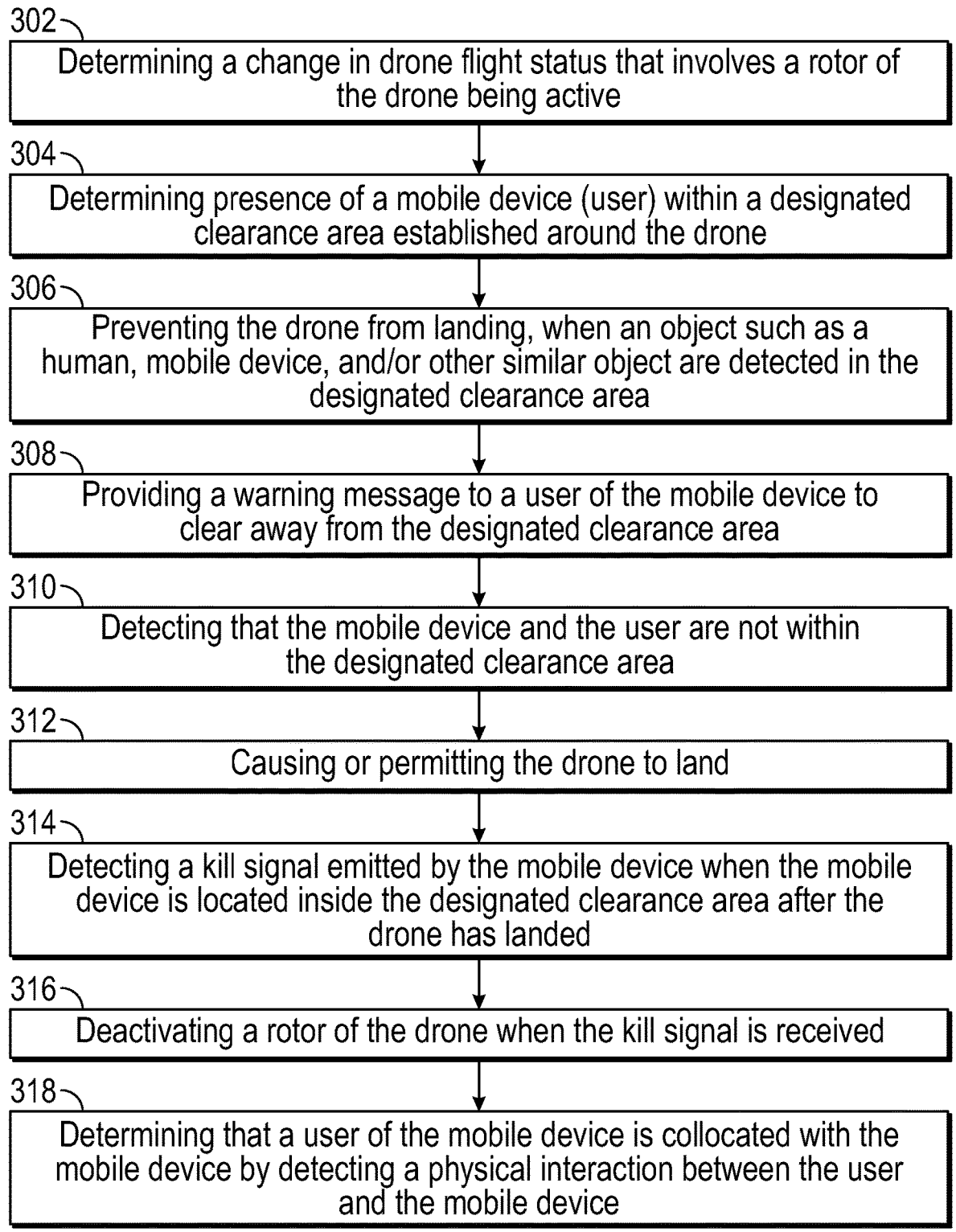
FIG. 3 is a flowchart of an example method of the present disclosure.

In one example scenario, a dispatcher could verify the number of passengers/occupants in the vehicle before the drone is dispatched. The dispatcher of the service provider 108 can communicate through an HMI 142 of the vehicle to confirm passenger presence. In some instances, one of the users, such as a driver of the vehicle can be assigned as the primary administrator/on-site liaison with special privileges is interact with dispatch (service provider 108) and/or the drone. a FIG. 3 is a flowchart of an example method of the present disclosure. The method can include a step 302 of determining a change in drone flight status that involves a rotor of the drone being active. This can include the drone attempting to land, engage its rotor(s) prior to takeoff, and/or liftoff for flight. For example, the method can include a step 304 of determining the presence of a mobile device within a designated clearance area established around the drone. The detection of the mobile device is inferred as the presence of a human. This can alternatively include sensing the presence of a connected vehicle.

Next, the method includes a step 306 of preventing the drone from landing, when an object such as a human, mobile device, and/or other similar object are detected in the designated clearance area. The method can also include a step 308 of providing a warning message to a user of the mobile device to clear away from the designated clearance area. The method can include a step 310 of detecting that the mobile device and the user are not within the designated clearance area, as well as step 312 of causing or permitting the drone to land.

When the drone has landed, the drone can be configured to sense for individuals inside the designated clearance area prior to another change in drone state, such as rotor engagement prior to flight, and/or liftoff. Thus, the method can include a step 314 of detecting a kill signal emitted by the mobile device when the mobile device is located inside the designated clearance area after the drone has landed, as well as a step 316 of deactivating a rotor of the drone when the kill signal is received.

In some instances, the method can include a step 318 of determining that a user of the mobile device is collocated with the mobile device by detecting a physical interaction between the user and the mobile device. For example, the drone can detect or receive a signal that indicates that the user is depressing a button or is contacting a touchscreen on the mobile device. In an alternate step, the user can be determined to be in a vehicle when the drone receives signals from various vehicle sensors such as seat pressure sensors, seatbelt sensors, and the like.

The method can also include various steps such as obtaining localizing information from the mobile device or a connected vehicle to refine a location of the mobile device or the connected vehicle. In some instances, the method includes a step of obtaining camera output from each of a first camera of the drone and a second camera of the mobile device. The camera output can be provided to a service provider for use by a remote operator of the drone.

Figure 4:
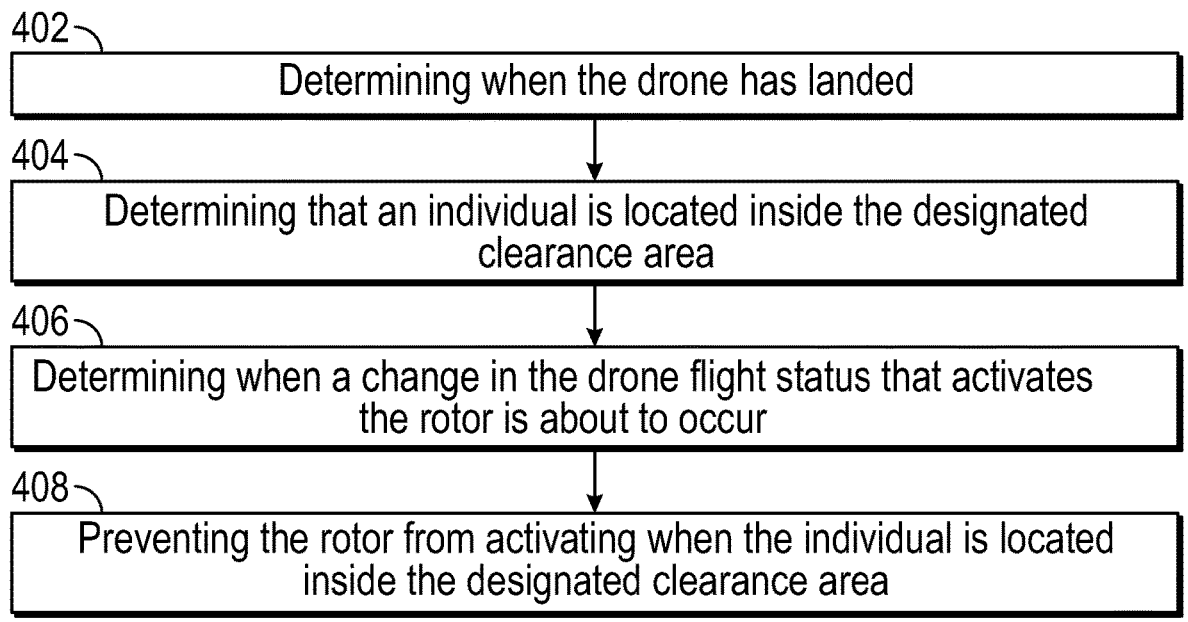
FIG. 4 is a flowchart of another example method of the present disclosure.

FIG. 4 is a flowchart of another example method. The method can include a step 402 of determining when the drone has landed. This can include detecting that the drone has contacted the ground using a camera view, as well as detecting that the rotor(s) of the drone are not rotating.

The method can include a step 404 of determining that an individual is located inside the designated clearance area. As noted above, this can include measuring distances between the drone and, the individual using LIDAR, ultrasonic sensing, radar, and the like. Again, the user may interact with the drone for any number of reasons. During these processes, it is advantageous to identify user presence and prevent drone status changes that may activate the rotor(s) of the drone.

For example, the method can include a step 406 of determining when a change in the drone flight status that activates the rotor is about to occur. For example, the drone may be scheduled to depart to another location in an autonomous mode. In another example, the drone may have received a signal to activate its rotors in anticipation of flight. This signal can be received from a remote operator of the drone. When this anticipated change in flight status occurs, the method can include a step 408 of preventing the rotor from activating when the individual is located inside the designated clearance area. As noted above, the rotor(s) can be prevented from being activated by tripping a switch that electrically couples the rotor(s) and the power source of the drone. Other methods for disabling the activation of the rotors can also be utilized.

Figure 5:
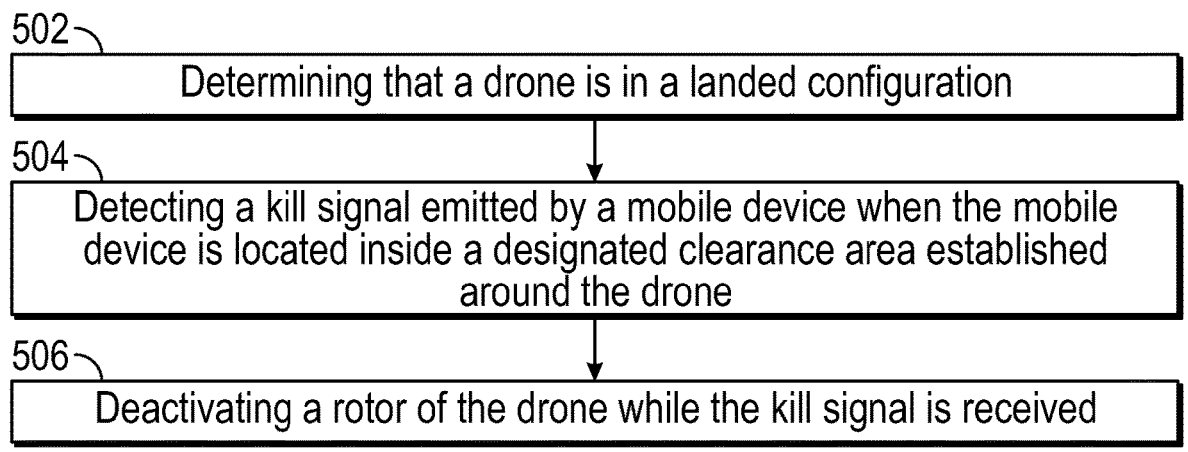
FIG. 5 is a flowchart of yet another example method of the present disclosure.

FIG. 5 is a flowchart of yet another example method. The method can include a step 502 of determining that a drone is in a landed configuration. That is, the drone flight status is "landed". Next, the method includes a step 504 of detecting a kill signal emitted by a mobile device when the mobile device is located inside a designated clearance area established around the drone. The kill signal can include specialized RF packets, pulses of ultrasonic waves, audio signals, light flashes, and the like. As long as the kill signal is being received by the drone, the method can include a step 506 of deactivating a rotor of the drone while the kill signal is received.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of, functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
   determining a change in drone flight status that involves a rotor of a drone being active;
   determining a presence of a mobile device within a designated clearance area established around the drone, wherein the designated clearance area is defined by a perimeter extending around the drone at a distance, and wherein the distance is based on a predetermined multiple of a dimension of the drone;
   preventing, based on the mobile device being within the designated clearance area, the drone from landing;
   providing, by the mobile device, a warning message to a user of the mobile device to clear away from the designated clearance area, wherein the user of the mobile device is collocated with the mobile device;
   detecting that the mobile device and the user are not within the designated clearance area;
   causing the drone to land;
   detecting a kill signal automatically emitted by the mobile device when the mobile device is located inside the designated clearance area after the drone has landed; and
   deactivating the rotor of the drone when the kill signal is received.

2. The method according to claim 1, further comprising determining that the user of the mobile device is collocated with the mobile device by detecting a physical interaction between the user and the mobile device.

3. The method according to claim 1, further comprising obtaining localizing information from the mobile device or a connected vehicle in communication with the drone to refine a location of the mobile device or the connected vehicle.

4. The method according to claim 1, further comprising obtaining camera output from each of a first camera of the drone and a second camera of the mobile device.

5. The method according to claim 4, further comprising providing the camera output to a service provider for use by a remote operator of the drone.

6. The method according to claim 1, further comprising obtaining camera output from a connected vehicle in communication with the drone and providing the camera output to the drone or a service provider.

7. The method according to claim 1, further comprising determining when the user of the mobile device is within a connected vehicle in communication with the drone based on output of any one or more of a seatbelt sensor, a bodyweight sensor, capacitive sensor, or combinations thereof.

8. The method according to claim 1, further comprising:
   determining when the drone has landed;
   determining that an individual is located inside the designated clearance area;
   determining when a change in the drone flight status that activates the rotor is about to occur; and
   preventing the rotor from activating when the individual is located inside the designated clearance area.

9. A system comprising:
   a processor; and
   a memory for storing instructions, the processor executing the instructions to:
     determine a change in drone flight status that involves a rotor of a drone being active;
     determine a presence of a mobile device within a designated clearance area established around the drone, wherein the designated clearance area is defined by a perimeter extending around the drone at a distance, and wherein the distance is based on a predetermined multiple of a dimension of the drone;
     cause the drone to hover rather than land;
     provide, by the mobile device, a warning message to a user of the mobile device to clear away from the designated clearance area, wherein the user of the mobile device is collocated with the mobile device;
     cause the drone to land when the mobile device is not detected within the designated clearance area;

detect a kill signal automatically emitted by the mobile device when the mobile device is located inside the designated clearance area after the drone has landed; and deactivate the rotor of the drone when the kill signal is received.

10. The system according to claim 9, wherein the processor is configured to execute the instructions to determine that the user of the mobile device is collocated with the mobile device by detecting a physical interaction between the user and the mobile device.

11. The system according to claim 9, wherein the processor is configured to execute the instructions to obtain localizing information from the mobile device or a connected vehicle in communication with the drone to refine a location of the mobile device or the connected vehicle.

12. The system according to claim 9, wherein the processor is configured to execute the instructions to obtain camera output from each of a first camera of the drone, a second camera of the mobile device, and a third camera of a connected vehicle in communication with the drone.

13. The system according to claim 12, wherein the processor is configured to execute the instructions to transmit the camera output of at least the first camera to a service provider for use by a remote operator of the drone, wherein the service provider also receives the camera output of the second camera from the mobile device and of the third camera from the connected vehicle.

14. The system according to claim 9, wherein the processor is configured to execute the instructions to determine when the user of the mobile device is within a connected vehicle in communication with the drone based on output of any one or more of a seatbelt sensor, a bodyweight sensor, a capacitive sensor, or combinations thereof.

15. A method comprising:
determining that a drone is in a landed configuration;
detecting a kill signal automatically emitted by a mobile device when the mobile device is located inside a designated clearance area established around the drone, wherein the designated clearance area is defined by a perimeter extending around the drone at a distance, and wherein the distance is based on a predetermined multiple of a dimension of the drone; and
deactivating a rotor of the drone while the kill signal is received.

16. The method according to claim 15, further comprising
determining a change in drone flight status that involves the rotor of the drone being active;
determining presence of an individual within the designated clearance area established around the drone;
preventing the rotor from being activated;
determining that the individual is no longer sensed within the designated clearance area; and
permitting the change in the drone flight status that involves the rotor of the drone being active.

17. The method according to claim 15, further comprising determining that a user of the mobile device is collocated with the mobile device by detecting a physical interaction between the user and the mobile device.

18. The method according to claim 15, further comprising obtaining localizing information from the mobile device or a connected vehicle in communication with the drone to refine a location of the mobile device or the connected vehicle.

* * * * *